(12) United States Patent
Iwatsu et al.

(10) Patent No.: US 8,841,810 B2
(45) Date of Patent: Sep. 23, 2014

(54) ROTOR FOR IPM MOTOR, AND IPM MOTOR EQUIPPED WITH SAME

(75) Inventors: Tomonaga Iwatsu, Hiroshima (JP); Yukio Katagiri, Hiroshima (JP); Susumu Fujiwara, Hiroshima (JP); Shigeru Morikawa, Hiroshima (JP)

(73) Assignee: Nisshin Steel Co., Ltd., Tokyo (JP)

( * ) Notice: Subject to any disclaimer, the term of this patent is extended or adjusted under 35 U.S.C. 154(b) by 0 days.

(21) Appl. No.: 14/007,870

(22) PCT Filed: Mar. 27, 2012

(86) PCT No.: PCT/JP2012/057927
§ 371 (c)(1),
(2), (4) Date: Sep. 26, 2013

(87) PCT Pub. No.: WO2012/133404
PCT Pub. Date: Oct. 4, 2012

(65) Prior Publication Data
US 2014/0015364 A1    Jan. 16, 2014

(30) Foreign Application Priority Data

Mar. 31, 2011  (JP) ................................. 2011-081214
Mar. 31, 2011  (JP) ................................. 2011-081215
Dec. 2, 2011   (JP) ................................. 2011-264671

(51) Int. Cl.
*H02K 1/02* (2006.01)
*H02K 1/27* (2006.01)
*H02K 1/00* (2006.01)

(52) U.S. Cl.
CPC .............. *H02K 1/272* (2013.01); *H02K 1/2766* (2013.01); *H02K 2213/03* (2013.01); *H02K 1/02* (2013.01)

USPC .......... 310/156.53; 310/156.45; 310/216.001; 310/43

(58) Field of Classification Search
CPC ........... H02K 1/02; H02K 1/04; H02K 1/246; H02K 1/272
USPC .............. 310/43–44, 156.45, 156.53–156.56, 310/216.001

See application file for complete search history.

(56) References Cited

U.S. PATENT DOCUMENTS 7,399,368 B2 *  7/2008  Komuro et al. ............... 148/122
7,880,357 B2 *  2/2011  Suzuki et al. ............ 310/156.43
8,508,092 B2 *  8/2013  Ankeney et al. ......... 310/156.33

(Continued)

FOREIGN PATENT DOCUMENTS

JP    H08-331784 A    12/1996
JP    H11-089144 A     3/1999

(Continued)

OTHER PUBLICATIONS

International Search Report from the International Bureau of WIPO for International Application No. PCT/JP2012/057927 dated Jun. 26, 2012 (2 pages).

*Primary Examiner* — Thanh Lam
(74) *Attorney, Agent, or Firm* — Fitch, Even, Tabin & Flannery LLP (57) ABSTRACT

A rotor iron core is used, which is formed by laminating a base steel sheets with a magnetic flux density (B8000) of 1.65 T or more as measured at a magnetic field strength of 8000 A/m and a coercivity of 100 A/m or more.

16 Claims, 4 Drawing Sheets

(56) References Cited

U.S. PATENT DOCUMENTS

| | | | |
|---|---|---|---|
| 8,624,457 B2 * | 1/2014 | Sakai et al. | 310/156.43 |
| 2007/0273241 A1 * | 11/2007 | Niguchi et al. | 310/259 |
| 2008/0143197 A1 * | 6/2008 | Lee et al. | 310/44 |
| 2010/0079025 A1 * | 4/2010 | Suzuki et al. | 310/156.11 |
| 2011/0304235 A1 * | 12/2011 | Hashiba et al. | 310/156.76 |
| 2012/0126637 A1 * | 5/2012 | Ankeney et al. | 310/43 |
| 2013/0127280 A1 * | 5/2013 | Sugimoto et al. | 310/156.01 |

FOREIGN PATENT DOCUMENTS

| | | |
|---|---|---|
| JP | 2000-278900 A | 10/2000 |
| JP | 2002-136009 A | 5/2002 |
| JP | 2003-049251 A | 2/2003 |
| JP | 2004-041000 A | 2/2004 |
| JP | 2005-224006 A | 8/2005 |
| JP | 2006-196855 A | 7/2006 |
| JP | 2007-306735 A | 11/2007 |
| JP | 2008-031553 A | 2/2008 |
| JP | 2008-231462 A | 10/2008 |
| JP | 2009-038908 A | 2/2009 |
| JP | 2009-046738 A | 3/2009 |
| JP | 2009-153230 A | 7/2009 |
| JP | 2010-229519 A | 10/2010 |
| JP | 2011-067048 A | 3/2011 |

* cited by examiner

ROTOR FOR IPM MOTOR, AND IPM MOTOR EQUIPPED WITH SAME

CROSS-REFERENCE TO RELATED APPLICATIONS

This application is a U.S. national phase application filed under 35 U.S.C. §371 of International Application PCT/JP2012/057927, filed on Mar. 27, 2012, designating the United States, which claims priority from Japanese Patent Application No. 2011-081214, filed Mar. 31, 2011, Japanese Patent Application No. 2011-081215, filed Mar. 31, 2011, and Japanese Patent Application No. 2011-264671, filed Dec. 2, 2011, which are hereby incorporated herein by reference in their entirety.

TECHNICAL FIELD

The present invention relates to a rotor for an interior permanent magnet motor (hereafter "IPM motor") that is used for electric vehicles, hybrid vehicles and machine tools, for example, and an IPM motor equipped with the rotor.

BACKGROUND ART

Generally, IPM motors, which use expensive permanent magnets, have high cost but higher efficiency than induction motors. Therefore IPM motors are widely used for driving motors and power generating motors for hybrid vehicles and electric vehicles, and motors for home electric appliances, various machine tools and industrial machines.

An iron core of IPM motors is constituted by a stator and a rotor. Since an AC magnetic field is directly applied to the iron core on the stator side via windings, the iron core on the stator side must have high magnetic permeability and high volume resistivity so as to reduce iron loss. Hence electromagnetic steel sheets, of which the soft magnetic characteristics have been improved by adding Si to ultra low carbon steel, are used for the iron core on the stator side.

The iron core on the rotor side, on the other hand, mainly plays a role of increasing magnetic flux density as a yoke, since a permanent magnet is embedded in the iron core on the rotor side. The iron core on the rotor side is subject to minor influence of the AC magnetic field generated from the stator side, but this influence is limited. Therefore in terms of characteristics, it is not necessary to use electromagnetic steel sheets, which are advantageous for the iron loss characteristic, for the iron core on the rotor side. However, the same electromagnetic steel sheets as the stator side are also used for the iron core on the rotor side because the product yield of the electromagnetic steel sheets drop and manufacturing costs of the motor increase if the electromagnetic steel sheets are used only for the stator.

In the case of mounting an IPM motor on a vehicle, miniaturization is sought for the IPM motor because a vehicle must be compact and light. In this case, the rotational speed of the rotor is increased in order to obtain a motor output (torque) equivalent to or more than a conventional motor despite the miniaturization. Generally the efficiency of a motor improves as the rotational speed of the rotor increases. However in the case of an IPM motor, an induced electromotive force is generated on the stator windings by the rotation of the embedded permanent magnet. The induced electromotive force increases as the rotation speed increases. Then the motor can no longer rotate when the electromotive force exceeds the input voltage.

Therefore in an IPM motor, a field-weakening control, which suppresses the induced electromotive force by generating a magnetic flux from the stator side in a direction to cancel the magnetic flux of the permanent magnet, is performed when the motor is operated in a high-speed rotation range, as disclosed in Japanese Patent Application Laid-Open No. 2000-278900 A, for example. Although operation in a high-speed rotation range becomes possible, the field-weakening control decreases the motor torque because power is used for cancelling the magnetic flux of the permanent magnet. According to Japanese Patent Application Laid-Open No. 2000-278900 A, electric energy to be used for the field-weakening control can be decreased by improving the shape of the magnet.

On the other hand, even if the IPM motor is miniaturized, there is a problem where the centrifugal force that acts upon the permanent magnet embedded in the rotor increases to damage the rotor if the rotational speed of the rotor is increased so as to obtain a torque equivalent to or higher than conventional motors. To prevent damage, it is preferable to use a material having high yield strength for the material of the rotor. For example, in the case of non-orientated electromagnetic steel sheets (35A300) containing about 3% Si, the yield strength after magnetic annealing is approximately 400 N/mm$^2$. Therefore in the case of a relatively large IPM motor where the diameter of the rotor is 80 mm or more, the limit of the rotational speed at which damage is not caused is about 20,000 rpm, although the value is somewhat different depending on the structure of the rotor. Various studies have been made to increase the yield strength of the iron core based on the electromagnetic steel sheets, but still the yield strength is at most about 780 N/mm$^2$.

In this way, an attempt is made to obtain higher torque by increasing rotational speed using the conventional rotor iron core made of electromagnetic steel sheets when an IPM motor is miniaturized, there is a limit on increasing the rotational speed because there are problems where torque decreases in the high-speed rotation range even if field-weakening control is performed, and the rotor could be damaged by the centrifugal force that acts on the permanent magnet.

As a method for suppressing damage to the rotor iron core due to high-speed rotation, Japanese Patent Application Laid-Open No. 2009-153230 A, for example, proposes to increase strength by using a material with softness and hardenability for the material of the rotor iron core, and selectively quenching only a bridge portion near a permanent magnet insertion hole and the vicinity thereof. Furthermore, Japanese Patent Application Laid-Open No. 2009-046738 A, for example, proposes to use not electromagnetic steel sheets but a material with high strength and a high saturation magnetic flux density for the material of the rotor iron core.

While developing steel sheets for a rotor for high-speed rotation, the present inventors manufactured experimental IPM motors using various steel sheets as materials, evaluated the performance of the motors, and as a result discovered that a large output torque can be obtained in a high-speed rotation range where the field-weakening control is performed by adjusting the coercivity of the base steel sheets. By obtaining a larger output torque, the rotor can be rotated at a higher rotational speed.

In Japanese Patent Application Laid-Open No. 2000-278900 A, an attempt was made to decrease the electric energy used for the field-weakening control by improving the shape of the magnet, but adjusting the coercivity of the base steel sheets was not considered here. In Japanese Patent Application Laid-Open No. 2009-153230 A and Japanese Patent Application Laid-Open No. 2009-046738 A as well, adjusting the coercivity of the base steel sheets is not considered. In other words, in conventional configurations, adjusting the coercivity of the base steel sheets is not considered, hence the output torque in a high rotation range becomes small, and the maximum rotational speed accordingly becomes low.

SUMMARY OF THE INVENTION

With the foregoing in view, it is an object of the present invention to provide a rotor for an IPM motor and an IPM motor which can increase the output torque in a high rotation range, and increase the maximum rotational speed.

A rotor for an IPM motor according to the present invention includes: a rotor iron core, which is formed by laminating base steel sheets with a magnetic flux density B8000 of 1.65 T or more as measured at a magnetic field strength of 8000 A/m and a coercivity of 100 A/m or more; a plurality of permanent magnet insertion holes which are formed with a space between each hole on the rotor iron core in a circumferential direction of the rotor iron core; and permanent magnets which are embedded in the permanent magnet insertion holes respectively.

In an IPM motor according to the present invention, the rotor is embedded.

According to the rotor for an IPM motor of the present invention, the rotor iron core, which is formed by laminating base steel sheets with a magnetic flux density B8000 of 1.65 T or more as measured at a magnetic field strength of 8000 A/m, and a coercivity of 100 A/m or more is used, therefore the output torque in the high rotation range can be increased, and the maximum rotation frequency can be increased.

Further, according to the IPM motor of the present invention, which uses the above mentioned rotor, the output torque in the high rotation range can be increased, and the maximum rotation frequency can be increased in the same manner.

Furthermore, the rotor for an IPM motor of the present invention is formed by laminating base steel sheets with a yield strength of 750 N/mm$^2$ or more, therefore the rotor is not damaged by the centrifugal force that acts on the permanent magnet even if the rotor is rotated at high-speed. This allows a decrease in the width of the bridge portion that is formed around the permanent magnet insertion holes. If the width of the bridge is narrower, the leaking magnetic flux can be effectively decreased, which increases flexibility in designing the rotor. Further, the permanent magnets can be miniaturized, hence the cost of the motor can be dramatically reduced.

DETAILED DESCRIPTION OF THE PREFERRED EMBODIMENTS

Embodiments of the present invention will now be described with reference to the drawings.

Figure 1:
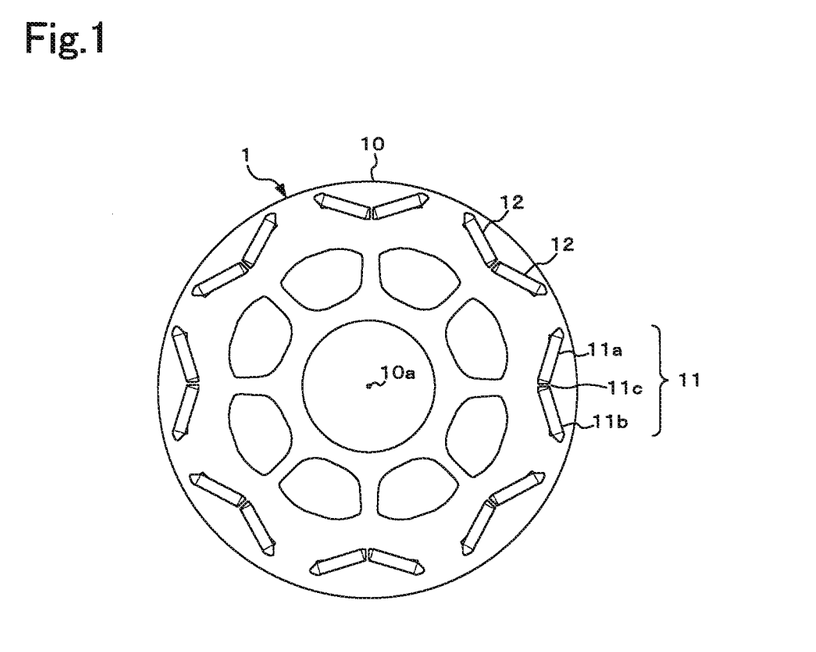
FIG. 1 is a front view depicting a rotor for an IPM motor according to an embodiment of the present invention.

FIG. 1 is a front view depicting a rotor for an IPM motor according to an embodiment of the present invention. As illustrated in FIG. 1, the rotor 1 of the IPM motor includes: a rotor iron core 10 (rotor main body) which is formed by laminating later mentioned steel sheets for a rotor (base steel sheets); a plurality of permanent magnet insertion holes 11 which are formed with a space between each hole on the rotor iron core 10 in a circumferential direction of the rotor iron core 10; and permanent magnets 12 which are embedded in the permanent magnet insertion holes 11 respectively. The IPM motor is configured by disposing a stator (not illustrated) on an outer circumference of the rotor 1.

Each permanent magnet insertion hole 11 includes first and second insertion holes 11a and 11b which are disposed in a V shape of which apex faces a rotation center 10a of the rotor iron core 10, and a bridge 11c which separates the first and second insertion holes 11a and 11b at the apex. The permanent magnet 12 is respectively embedded in the first and second insertion holes 11a and 11b. In other words, two permanent magnets 12 are embedded in one permanent magnet insertion hole 11.

Figure 2:
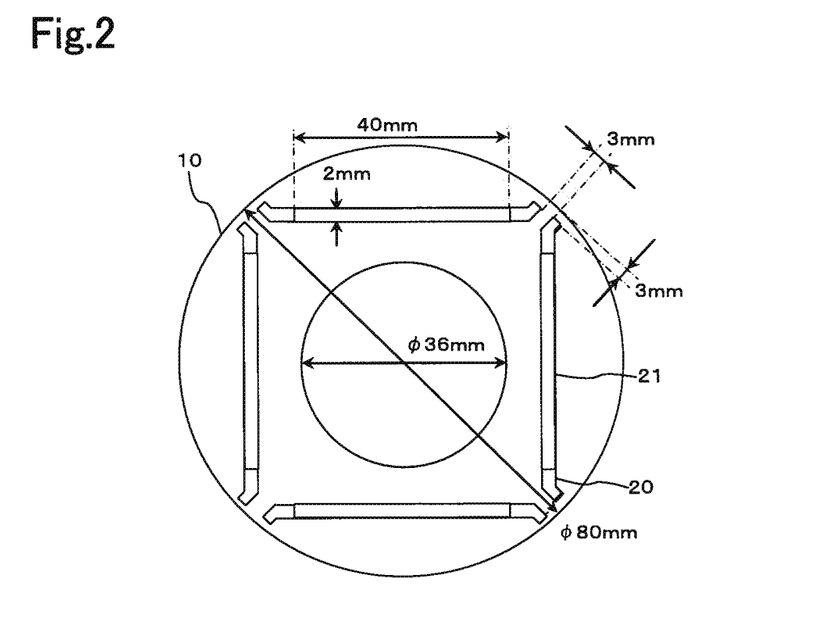
FIG. 2 is a front view depicting a rotor for an IPM motor which is different from the rotor in FIG. 1.

FIG. 2 is a front view depicting a rotor 2 of an IPM motor that is different from the rotor for the IPM motor in FIG. 1. Constructional elements the same as or similar to the constructional elements of the rotor 1 in FIG. 1 are denoted by the same reference symbols. As illustrated in FIG. 2, the rotor 2 includes: a rotor iron core 10; a plurality of permanent magnet insertion holes 20 which are formed with a space between each hole on the rotor iron core 10 in a circumferential direction of the rotor iron core 10; and permanent magnets 21 which are respectively embedded in the permanent magnet insertion holes 20. Just like the rotor iron core 10 of the rotor 1 in FIG. 1, the rotor iron core 10 is formed by laminating later mentioned base steel sheets.

Each permanent magnet insertion hole 20 is disposed every 90° in the circumferential direction of the rotor iron core 10. Each permanent magnet insertion hole 20 is formed to have a linear shape, and one permanent magnet 21 is embedded in each permanent magnet insertion hole 20.

In the case of an IPM motor using rotor 1 or 2 illustrated in FIG. 1 or FIG. 2, field-weakening control, for suppressing induced electromotive force, is performed by generating a magnetic flux from the stator side in a direction to cancel the magnetic flux of the permanent magnets 12, when the IPM motor is operated in a high-speed rotation range. The rated rotational speed of such an IPM motor is 7500 rpm when the rotor 1 in FIG. 1 is used, and 10000 rpm if the rotor 2 in FIG. 2 is used. This field-weakening control is performed in the high-speed rotation range where the rated rotation speed is exceeded.

The rotor iron core 10 is formed by laminating base steel sheets with a magnetic flux density B8000 of 1.65 T or more as measured at a magnetic field strength of 8000 A/m, and having a coercivity of 100 A/m or more.

A value of the magnetic flux density B8000 of 1.65 T or more is to effectively utilize the reluctance torque based on the difference of inductance between a position where the permanent magnet 12 is inserted (d axis) and a position where the permanent magnet 12 is not inserted (q axis) when the rotor 1 rotates at high-speed, and especially to demonstrate a torque performance equivalent to or greater than conventional steel sheets in the high-speed rotation range.

The reason why coercivity is 100 A/m or more is as follows. If the input current of a motor is increased, the output torque generally increases. However it is known that in the case of IPM motors, the q axis inductance decreases and the reluctance torque drops if the input current is increased due to the influence of the magnetic saturation of the iron core material, as described in "Bulletin of Department of Technology of Tokyo Gakugei University, Vol. 27, No. 1 (2004), pp. 126 to 132" for instance. In other words, in the case of steel sheets of which coercivity is low, such as electromagnetic steel sheets, magnetic saturation is easily generated, therefore the reluctance torque cannot be increased immediately, even if the input current is increased. While in the case of using base steel sheets of which coercivity is high, a drop in the reluctance torque can be suppressed even if the input current value is relatively high since magnetic saturation is not easily generated. As a result, the output torque and efficiency can be improved. The present inventors manufactured experimental IPM motors using various steel sheets as the material, and evaluated the performance of the motors, and as a result discovered that the power consumption of the field-weakening control, which is performed during high-speed rotation, can be reduced and the output torque can be improved by forming the rotor iron core 10 using base steel sheets with a coercivity of 100 A/m or more. However, if coercivity increases, the magnetic flux density tends to decrease, and sufficient reluctance torque can no longer be obtained when the value of the magnetic flux density B8000 becomes less than 1.65 T.

It is preferable that the base steel sheets of the rotor iron core 10 have a yield strength of 750 N/mm² or more. If the yield strength is in this range, the rotor iron core 10 can withstand the centrifugal force that acts on the permanent magnets during high-speed rotation, and the rotor is not damaged even in a high-speed rotation range. Furthermore, if the rotor iron core 10 of the present invention is used, a drop in torque is suppressed even in the high-speed rotation range because the base steel sheets excel in field-weakening control characteristics, therefore a high performance motor which implements high-speed rotation and high torque can be provided. As a result, the motor with the rotor iron core 10 can be used in various application fields, including automobiles and home electric appliances.

The bridge 11c formed in each permanent magnetic insertion hole 11 of the rotor 1 in FIG. 1 is for ensuring strength around each permanent magnet insertion hole 11. The width of the bridge 11c (width of the bridge 11c located in the space between the first and second insertion holes 11a and 11b) can be decreased by making the base steel sheets themselves have sufficient strength, whereby leaking magnetic flux can be decreased. If it is possible to prevent damage to the rotor and decrease the leaking magnetic flux even if the width of the bridge 11c is smaller by increasing the strength of the rotor iron core, to improve flexibility in designing the rotor. Further, the permanent magnet 12 can be miniaturized because leaking magnetic flux is decreased, which means that the cost of the motor can be reduced dramatically. The output torque may be improved without miniaturizing the permanent magnet 12. The bridge width may be designed considering both increased torque in accordance with realization of high-speed rotation and miniaturization of the permanent magnet.

The upper limit of the yield strength of the base steel sheets of the rotor iron core 10 is 2000 N/mm². This is because the value of the magnetic flux density B8000 measured at the magnetic field strength of 8000 A/m cannot be 1.65 T or more if a material having the yield strength exceeding 2000 N/mm² is used.

EXAMPLES

The present inventors manufactured base steel sheets of the rotor iron core 10 by the following manufacturing method A using each steels having the component compositions shown in Table 1.

Manufacturing Method A

Each of the steels having the component compositions shown in Table 1 were melted in a vacuum, continuous cast slabs thereof were heated to 1250° C., finish-rolled at 950° C., and wound up at 560° C. As result hot-rolled steel sheets with a sheet thickness of 1.8 mm were obtained. After performing acid-cleaning for the hot-rolled steel sheets, cold-rolled steel sheet strips with a sheet thickness of 0.35 mm were obtained by performing cold rolling once (final reduction rate: approximately 81%). Then tension annealing processing (tensile strength: 100 N/mm²) was performed on the obtained cold-rolled steel sheet strips by threading the strips through a continuous furnace set at 400° C. for 60 seconds. Then an insulation film, with a semi-organic composition having a thickness of approximately 1 μm, containing Cr oxide and Mg oxide, was formed on both sides of the steel sheets.

TABLE 1

Component composition of samples

| Steel No. | C | Si | Mn | P | S | sol. Al | Si + sol. Al | Ti, Nb, V | Mo, Cr, Cu, Ni, B |
|---|---|---|---|---|---|---|---|---|---|
| 1 | 0.0005 | 0.22 | 0.24 | 0.013 | 0.005 | 0.02 | 0.24 | 0.039 | B: 0.002 |
| 2 | 0.0018 | 0.46 | 1.36 | 0.016 | 0.004 | 0.02 | 0.48 | — | — |
| 3 | 0.011 | 0.24 | 0.65 | 0.023 | 0.004 | 0.04 | 0.28 | — | — |
| 4 | 0.057 | 0.002 | 2.44 | 0.035 | 0.008 | 0.03 | 0.03 | — | — |
| 5 | 0.221 | 0.20 | 0.92 | 0.016 | 0.003 | 0.03 | 0.23 | Ti: 0.015 | B: 0.003 |
| 6 | 0.822 | 0.23 | 0.46 | 0.013 | 0.010 | 0.005 | 0.24 | — | — |
| 7 | 1.202 | 0.82 | 0.48 | 0.012 | 0.009 | 0.05 | 0.87 | — | — |
| 8 | 0.201 | 0.45 | 0.62 | 0.087 | 0.009 | 0.07 | 0.52 | — | — |
| 9 | 0.064 | 0.30 | 2.07 | 0.017 | 0.004 | 0.024 | 0.32 | Ti: 0.038 Nb: 0.022 | Cu: 0.05 |

Evaluation of Base Steel Sheets Fabricated by Manufacturing Method A

JIS No. 5 test pieces were extracted from the obtained steel strips to be used for the tensile test. Further, ring-shaped test pieces having an inner diameter of 33 mm and an outer diameter of 45 mm were fabricated by punching to be used for measuring magnetization. Table 2 shows the yield strength, tensile strength, yield ratio (YR), magnetic flux density ($B_{8000}$) measured when the magnetic field strength is 8000 A/m and coercivity (Hc).

TABLE 2

Various characteristics of base steel sheets fabricated by manufacturing method A

| Steel No. | Yield Strength (N·mm⁻²) | Tensile Strength (N·mm⁻²) | YR (%) | $B_{8000}$ (T) | Coercivity Hc (A/m) | Remarks |
|---|---|---|---|---|---|---|
| 1 | 620 | 651 | 95 | 1.84 | 696 | Present invention example |

TABLE 2-continued

Various characteristics of base steel sheets fabricated by manufacturing method A

| Steel No. | Yield Strength (N·mm$^{-2}$) | Tensile Strength (N·mm$^{-2}$) | YR (%) | $B_{8000}$ (T) | Coercivity Hc (A/m) | Remarks |
|---|---|---|---|---|---|---|
| 2 | 749 | 776 | 97 | 1.81 | 798 | Present invention example |
| 3 | 672 | 693 | 97 | 1.84 | 775 | Present invention example |
| 4 | 999 | 1024 | 98 | 1.81 | 1021 | Present invention example |
| 5 | 928 | 961 | 97 | 1.75 | 978 | Present invention example |
| 6 | 981 | 1033 | 95 | 1.65 | 1065 | Present invention example |
| 8 | 907 | 944 | 96 | 1.75 | 1004 | Present invention example |
| 9 | 997 | 1048 | 95 | 1.75 | 1165 | Present invention example |

Further, the present inventors manufactured base steel sheets of the rotor 10 by the following manufacturing method B, using steels having the component compositions shown in Table 1.

Manufacturing Method B

Each of the steel having the component compositions in Table 1 were melted, and continuous cast slabs thereof were heated to 1250° C., finish-rolled at 850° C. and wound up at 560° C. As a result hot-rolled steel sheets with a sheet thickness of 1.8 mm were obtained. After performing acid-cleaning for the hot-rolled steel sheets, cold-rolled steel sheets with a sheet thickness of 0.35 mm were obtained by performing cold rolling. The obtained cold-rolled steel sheets are heated to 900° C., threaded into a Pb-Bi alloy bath set at 250° C. so as to cool down to 250° C. at an average cooling speed of 100° C./sec, and then without a break, press tempering was performed while keeping the steel sheets in an electric furnace set at 400° C. for 60 seconds. Then an insulation film, with a semi-organic composition having a thickness of approximately 1 μm, containing Cr oxide and Mg oxide, was coated onto both sides of the steel sheets.

Evaluation of Base Steel Sheets Fabricated by Manufacturing Method B

The same testing as the above mentioned base steel sheets fabricated by manufacturing method A was performed for the base steel sheets fabricated by manufacturing method B. Table 3 shows the results.

TABLE 3

Various characteristics of base steel sheets fabricated by manufacturing method B

| Steel No. | Yield Strength (N·mm$^{-2}$) | Tensile Strength (N·mm$^{-2}$) | YR (%) | $B_{8000}$ (T) | Coercivity Hc (A/m) | Remarks |
|---|---|---|---|---|---|---|
| 1 | 249 | 346 | 72 | 1.89 | 254 | Present invention example |
| 2 | 314 | 393 | 80 | 1.86 | 469 | Present invention example |
| 3 | 364 | 460 | 79 | 1.86 | 731 | Present invention example |
| 4 | 767 | 919 | 83 | 1.80 | 1012 | Present invention example |
| 5 | 893 | 1092 | 82 | 1.77 | 1133 | Present invention example |
| 6 | 1315 | 1467 | 90 | 1.76 | 1893 | Present invention example |
| 7 | 1703 | 1941 | 88 | <u>1.61</u> | 2675 | Comparison example |
| 8 | 1123 | 1206 | 93 | 1.76 | 1324 | Present invention example |
| 9 | 829 | 921 | 90 | 1.73 | 1016 | Present invention example |

Underline indicates a value which does not satisfy conditions specified in present invention.

Furthermore, the present inventors manufactured base steel sheets of the rotor 10 by the following manufacturing method C, using steels having the component compositions shown in Table 1.

Manufacturing Method C

The continuous cast slabs of steels Nos. 1, 2, 3, 4 and 5 having the component compositions shown in Table 1, were heated to 1250° C. in the same manner as manufacturing method A, finish-rolled at 950° C. and wound up at 560° C. As a result hot-rolled steel sheets with a sheet thickness of 1.8 mm were obtained. After performing acid-cleaning for the hot-rolled steel sheets, cold-rolled steel sheet strips with a sheet thickness of 0.35 mm were obtained by performing cold rolling once (final reduction rate: approximately 81%). Then re-crystallization annealing was performed on the obtained cold-rolled steel strips by threading the strips through a continuous furnace set at 800° C. for 60 seconds. For cooling, the strip was cooled down to 550° C. at 8° C./sec., and held in the continuous furnace set at 450° C. for 120 sec. or longer, as over-aging processing. Then light cold rolling was performed with an elongation rate of 0.3%, and then an insulation film, with a semi-organic composition having a thickness of approximately 1 μm, containing Cr oxide and Mg oxide, was coated onto both sides of the steel sheets.

Evaluation of Base Steel Sheets Fabricated by Manufacturing Method C

The same testing as for the above mentioned base steel sheets fabricated by manufacturing methods A and B was performed for the base steel sheets fabricated by manufacturing method C. Table 4 shows the results.

TABLE 4

Various characteristics of base steel sheets fabricated by manufacturing method C

| Steel No. | Yield Strength (N·mm$^{-2}$) | Tensile Strength (N·mm$^{-2}$) | YR (%) | $B_{8000}$ (T) | Coercivity Hc (A/m) | Remarks |
|---|---|---|---|---|---|---|
| 1 | 203 | 267 | 76 | 1.89 | <u>58</u> | Comparison example |
| 2 | 288 | 369 | 78 | 1.87 | <u>97</u> | Comparison example |
| 3 | 290 | 358 | 81 | 1.87 | <u>83</u> | Comparison example |
| 4 | 456 | 532 | 86 | 1.81 | 124 | Present invention example |
| 5 | 393 | 447 | 88 | 1.77 | 145 | Present invention example |

Underline indicates a value which does not satisfy conditions specified in present invention.

Evaluation as IPM Motor (Regarding Magnetic Flux Density and Coercivity)

Figure 3:
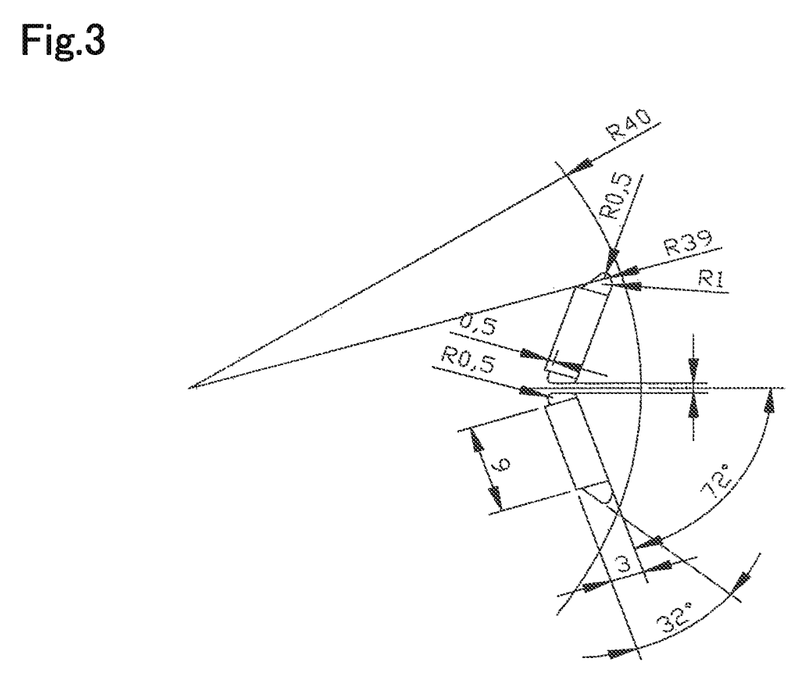
FIG. 3 is a diagram depicting a first rotor used for evaluating base steel sheets.

As shown in Table 5, a first rotor having the eight-pole (four-pole pair) structure shown in FIG. 3 was fabricated by punching using No. 1 steel, No. 3 steel, No. 5 steel and No. 9 steel fabricated by manufacturing method A, No. 1 steel, No. 2 steel, No. 4 steel, No. 6 steel and No. 7 steel fabricated by manufacturing method B, and No. 1 steel, No. 2 steel, No. 4 steel and No. 5 steel fabricated by manufacturing method C, and a motor performance evaluation test with a load torque was performed on the first rotor. For comparison, a rotor was also fabricated using commercial electromagnetic steel sheets (35A300), and evaluated in the same manner. Only one stator was fabricated in combination with each rotor fabricated above, and performance as a motor was evaluated. The maximum output of all motors was 4.5 kw. In this performance evaluation, field-weakening control was performed at 10000 rpm or more. The mechanical characteristics and magnetic characteristics evaluated for the commercial electromagnetic steel sheets (35A300) using the same method as for the base steel sheets of the present invention are as follows.

Sheet thickness: 0.35 mm
Yield strength: 381 N/mm$^2$
Tensile strength: 511 N/mm$^2$
Saturation magnetic flux density B8000: 1.76 T
Coercivity: 75 A/m

TABLE 5

Evaluation IPM motor (magnetic flux density and coercivity)

| Mfg. Method | Steel No. | $B_{8000}$ (T) | Hc (A/m) | Motor performance at 15000 rpm Torque (N·m) | Motor performance at 15000 rpm Efficiency (%) | Remarks |
|---|---|---|---|---|---|---|
| — | Electromagnetic steel sheets 35A300 | 1.76 | <u>75</u> | 1.5 | 45 | Comparison example |
| A | 1 | 1.84 | 696 | 2.6 | 77 | Present invention example |
| | 3 | 1.84 | 775 | 2.7 | 80 | Present invention example |
| | 5 | 1.75 | 978 | 2.6 | 77 | Present invention example |
| | 9 | 1.75 | 1165 | 2.7 | 80 | Present invention example |
| B | 1 | 1.89 | 254 | 2.2 | 65 | Present invention example |
| | 2 | 1.86 | 469 | 2.6 | 77 | Present invention example |
| | 4 | 1.80 | 1012 | 2.8 | 83 | Present invention example |
| | 6 | 1.76 | 1893 | 3.1 | 92 | Present invention example |
| | 7 | <u>1.61</u> | 2675 | 1.7 | 51 | Comparison example |
| C | 1 | 1.89 | <u>58</u> | 1.7 | 51 | Comparison example |
| | 2 | 1.87 | <u>97</u> | 1.8 | 54 | Comparison example |
| | 4 | 1.81 | 124 | 2.1 | 62 | Present invention example |
| | 5 | 1.77 | 145 | 2.2 | 65 | Present invention example |

Underline indicates a value which does not satisfy conditions specified in present invention.

Specifications of the fabricated rotor and stator are as follows.

Figure 4:
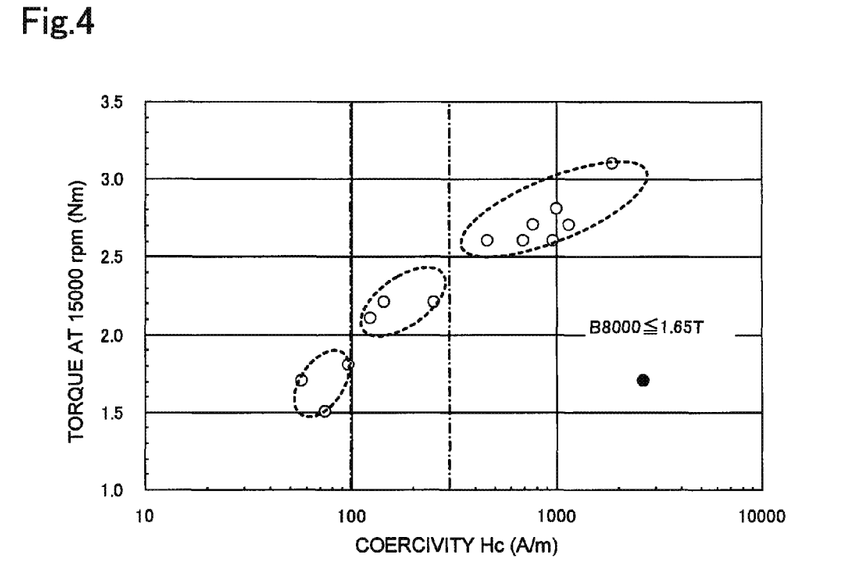
FIG. 4 is a graph depicting a relationship between a maximum torque at 15000 rpm and the coercivity of the IPM motor using the base steel sheets.
Figure 5:
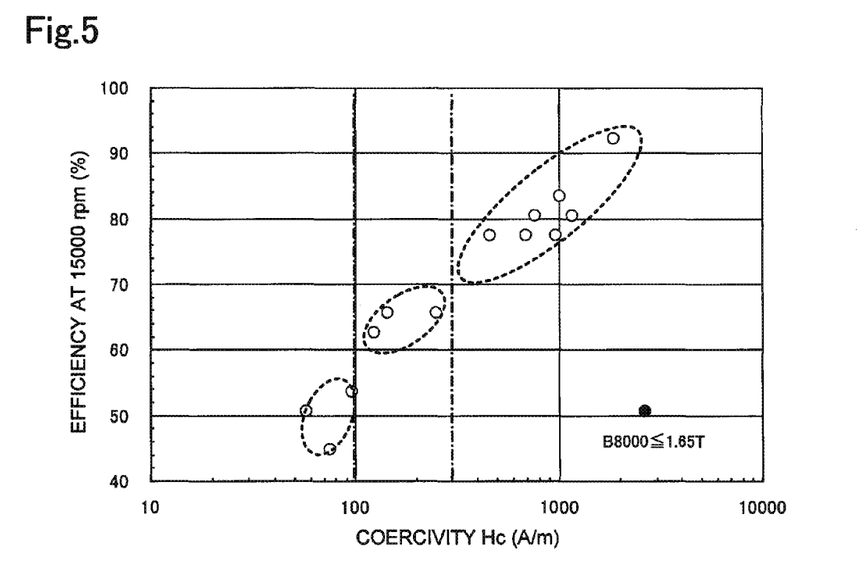
FIG. 5 is a graph depicting a relationship between the efficiency at 15000 rpm and the coercivity of the IPM motor using the base steel sheets.

Specifications of first rotor
Outer diameter: 80.1 mm
Shaft length: 50 mm
  Number of laminated layers: 0.35 mm/140 layers
  Width of center bridge and outer bridge: 1.00 mm
  Permanent magnet: neodymium magnet (NEOMAX—38 VH), 9.0 mm width×3.0 mm thickness×50 mm length, embedded in a total of 16 locations
  Specifications of stator
  Gap length: 0.5 mm
  Outer diameter: 138.0 mm; yoke thickness: 10 mm; length: 50 mm
  Iron core material: electromagnetic steel sheets (35A300); sheet thickness: 0.35 mm
  Number of laminated layers: 140 layers
  Winding method: distributed winding Table 5 includes the maximum torque and efficiency of the motor at 15000 rpm when each first rotor is installed. FIG. 4 shows the relationship between the maximum torque at 15000 rpm and coercivity, and FIG. 5 shows the relationship between the efficiency at 15000 rpm and coercivity. For this performance evaluation as well, field-weakening control is performed at 10000 rpm or more.

As Table 5, FIG. 4 and FIG. 5 clarify, in the case of each motor enclosing a rotor in which the material of the rotor iron core is steel sheets with a coercivity Hc less than 100 A/m (electromagnetic steel sheets and No. 1 steel and No. 2 steel fabricated by manufacturing method C), the torque at 15000 rpm is low, less than 2.0 N·m, and efficiency is also low, less than 60%. Whereas in the case of each motor of which rotor iron core is base steel sheets with the magnetic flux density and the coercivity in the range according to the present invention, a high torque exceeding 2.0 N·m and a good efficiency of 60% or more can be implemented. Especially in a range of coercivity of 300 A/m or more, an even higher torque of 2.5 N·m or more and a high efficiency of 70% or more can be implemented.

In the case of the No. 7 steel fabricated by manufacturing method B, having a high coercivity but low magnetic flux density B8000 of 1.61 T, the torque and efficiency are low due to the low magnetic flux density.

Evaluation as IPM Motor (Bridge Width and Strength)

Figure 6:
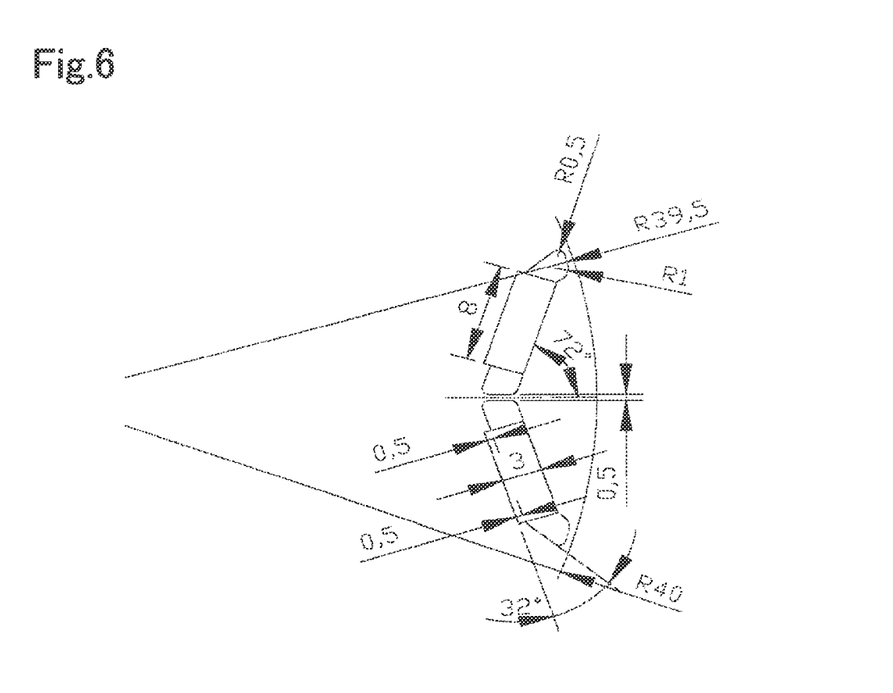
FIG. 6 is a diagram depicting a second rotor used for evaluating base steel sheets.

The present inventors further fabricated the second rotor shown in FIG. 6 using the No. 4 steel (yield strength exceeds 750 N/mm$^2$) and the No. 6 steel (with the highest yield strength) fabricated by manufacturing method B (these steels are called "ultra high strength steel sheets" hereon). Compared with the first rotor in FIG. 3, the bridge width of the second rotor in FIG. 6 was decreased by ½ so as to reduce the leaking magnetic flux, and the size of the permanent magnet of the second motor was decreased from a 9.0 mm width to an 8.0 mm width (miniaturized approximately 11%). Further, the field-weakening control was performed at 10000 rpm or more.

Specifications of the second rotor are as follows. The stator was the same as the above mentioned stator used for the evaluation of the magnetic flux density and coercivity.

Specifications of second rotor

Outer diameter: 80.1 mm

Shaft length: 50 mm

Number of laminated layers: 0.35 mm/140 layers

Width of center bridge and outer bridge: 0.5 mm

Permanent magnet: neodymium magnet (NEOMAX—38 VH), 8.0 mm width×3.0 mm thickness×50 mm length, embedded in a total of 16 locations For comparison, the first and second rotors were fabricated using the electromagnetic steel sheets. Table 6 shows the maximum torque and efficiency of the IPM motors using a rotor made of electromagnetic steel sheets, and IPM rotors using a rotor made of the No. 6 steel fabricated by manufacturing method B, operated at 5000 rpm to 15000 rpm.

TABLE 6

Evaluation as IPM motor (bridge width)

| Rotor iron core | Rotor | 5000 rpm Max torque (N·m) | 5000 rpm Motor efficiency (%) | 7500 rpm Max torque (N·m) | 7500 rpm Motor efficiency (%) | 10000 rpm Max torque (N·m) | 10000 rpm Motor efficiency (%) | 15000 rpm Max torque (N·m) | 15000 rpm Motor efficiency (%) |
|---|---|---|---|---|---|---|---|---|---|
| Electromagnetic steel sheets 35A300 | 1$^{st}$ rotor | 5.4 | 80 | 5.4 | 80 | 4.7 | 93 | 1.5 | 45 |
|  | 2$^{nd}$ rotor | 5.4 | 80 | 5.4 | 80 | 4.6 | 91 | 1.6 | 48 |
| Mfg. method B No. 6 | 1$^{st}$ rotor | 5.5 | 82 | 5.5 | 82 | 4.9 | 96 | 3.1 | 92 |
|  | 2$^{nd}$ rotor | 5.5 | 81 | 5.5 | 82 | 4.8 | 95 | 3.0 | 89 |

As Table 6 shows, if ultra high strength steel sheets are used for the material of the rotor iron core, a rotor having a motor performance equivalent to or better than a rotor in which the iron core material is electromagnetic steel sheets is obtained, even if the width of the bridge is decreased or if the permanent magnets are miniaturized as in the case of the second rotor. Especially in a high-speed rotation range exceeding 10000 rpm, a good high torque characteristic can be obtained because of an improvement in field-weakening control due to coercivity.

Furthermore, the rotors used for the above mentioned test were removed from the stator and a steel cover attached, then the motor was connected to a load motor via a transmission and driven from the load motor side, and in this state, an overspeed test, up to 50000 rpm, was performed, and the rotation speed at which a rotor was damaged by centrifugal force was examined. Table 7 shows the results.

TABLE 7

Evaluation as IPM motor (strength)

| | Rotor iron core | | | | | | | |
|---|---|---|---|---|---|---|---|---|
| | Electromagnetic steel sheets/35A300 | | Ultra high strength steel sheets | | | | | |
| | | | Mfg. method A, No. 6 | | Mfg. method B, No. 4 | | Mfg. method B, No. 6 | |
| | Rotor | | | | | | | |
| | 1$^{st}$ rotor | 2$^{nd}$ rotor | 1$^{st}$ rotor | 2$^{nd}$ rotor | 1$^{st}$ rotor | 2$^{nd}$ rotor | 1$^{st}$ rotor | 2$^{nd}$ rotor |
| RPM at rupture | 30450 | 25500 | 49000 | 42000 | 43200 | 36000 | ≥50000 (no rupture) | 45300 |

As Table 7 shows, in the case of the first rotor which uses electromagnetic steel sheets as the rotor material and has a bridge width of 1.0 mm, the rotor was damaged at 30450 rpm. On the other hand, if the No. 4 steel fabricated by manufacturing method B, which is an ultra high strength steel sheets with a yield strength of 750 N/mm$^2$ or more, was used as the rotor material, the first rotor was not ruptured until 43200 rpm, and even the second rotor, of which bridge width was decreased to 0.5 mm, was not ruptured until 36000 rpm, which is equivalent to or higher than the first rotor made of electromagnetic steel. In the case of the No. 6 steel fabricated by manufacturing method A, which has a yield strength of 950 N/mm$^2$ or more, the second rotor having a bridge width of 0.5 mm was not ruptured until 42000 rpm, and in the case of the No. 6 steel fabricated by manufacturing method B, which has a yield strength of 1300 N/mm$^2$ or more, the first rotor was not ruptured even at 50000 rpm. Thus it is confirmed that rupture can be prevented up to a rotation frequency higher than the case of electromagnetic steel sheets if the ultra high strength steel sheets of the present invention are used for the rotor material.

In the examining damaged rotors, it was found that both the inner bridge portion and the outer bridge portion were deformed or ruptured, and that the permanent magnets fell out of all the rotors. The outer bridge portion is the portion where a permanent magnet insertion hole is close to the periphery of the motor.

Evaluation as IPM motor (in the case of using the rotor in FIG. 2)

The present inventors fabricated the rotor 2 (third rotor) shown in FIG. 2 using ultra high strength steel sheets, and conducted a motor performance evaluation test. A rotor using electromagnetic steel sheets was also fabricated and evaluated in the same manner. The maximum output of the IPM motor 2 was 3.7 kw.

Specifications of the fabricated rotor and stator are as follows.

Specifications of third rotor
Outer diameter: 80.0 mm
Shaft length: 75 mm
Number of laminated layers: 0.35 mm/210 layers
Width of bridge: 3.0 mm
Permanent magnet: neodymium magnet (NEOMAX38 VH), 40.0 mm width×2.0 mm thickness×75 mm length, embedded in a total of 4 locations
Specifications of stator
Gap length: 0.5 mm
Outer diameter: 160.0 mm; yoke thickness: 17 mm; length: 75 mm
Iron core material: electromagnetic steel sheets (35A300); sheet thickness: 0.35 mm
Number of laminated layers: 210 layers
Winding method: distributed winding Table 8 shows the maximum torque and efficiency of IPM motors using each rotor operated in a 5000 rpm to 12000 rpm range. The field-weakening control was performed at a rotation frequency exceeding 10000 rpm.

TABLE 8

| | Evaluation as IPM motor (in the case of rotor in FIG. 2) | | | | | | | |
|---|---|---|---|---|---|---|---|---|
| | 5000 rpm | | 7500 rpm | | 10000 rpm | | 12000 rpm | |
| Rotor iron core | Max torque (N·m) | Motor efficiency (%) | Max torque (N·m) | Motor efficiency (%) | Max torque (N·m) | Motor efficiency (%) | Max torque (N·m) | Motor efficiency (%) |
| Electromagnetic steel sheets 35A300 | 5.2 | 87 | 5.1 | 90 | 4.9 | 91 | Does not rotate | |
| Mfg. method B, No. 6 | 5.5 | 82 | 5.5 | 82 | 4.9 | 96 | 2.5 | 90 |

As Table 8 shows, in the case of using electromagnetic steel sheets, the motor can no longer rotate at 12000 rpm, even if field-weakening control is performed. In the case of the rotor using the No. 6 steel having high coercivity, on the other hand, rotation is possible at 12000 rpm, and can be driven in a higher rotation range.

The invention claimed is:

1. A rotor for an IPM motor embedded in an IPM motor where a field-weakening control is performed when rotational speed exceeds a predetermined value, comprising:
   a rotor iron core, which is formed by laminating base steel sheets with a magnetic flux density B8000 of 1.65T or more as measured at a magnetic field strength of 8000 A/m and a coercivity of 100 A/m or more;
   a plurality of permanent magnet insertion holes which are formed spaced from each other on the rotor iron core in a circumferential direction of the rotor iron core; and
   permanent magnets which are embedded in the permanent magnet insertion holes respectively.

2. The rotor for an IPM motor according to claim 1, wherein
   the coercivity of the base steel sheets is 300 A/m or more.

3. The rotor for an IPM motor according to claim 1, wherein
   the yield strength of the base steel sheets is 750 N/mm$^2$ or more.

4. The rotor for an IPM motor according to claim 1, wherein
   the yield strength of the base steel sheets is 950 N/mm$^2$ or more.

5. The rotor for an IPM motor according to claim 1, wherein
   the yield strength of the base steel sheets is 1300 N/mm$^2$.

6. An IPM motor in which a field-weakening control is performed when rotational speed exceeds a predetermined value, and in which the rotor according to claim 1 is embedded.

7. The rotor for an IPM motor according to claim 2, wherein
   the yield strength of the base steel sheets is 750 N/mm$^2$ or more.

8. The rotor for an IPM motor according to claim 2, wherein
   the yield strength of the base steel sheets is 950 N/mm$^2$ or more.

9. The rotor for an IPM motor according to claim 2, wherein
the yield strength of the base steel sheets is 1300 N/mm$^2$.

10. An IPM motor in which a field-weakening control is performed when rotational speed exceeds a predetermined value, and in which the rotor according to claim 2 is embedded.

11. An IPM motor in which a field-weakening control is performed when rotational speed exceeds a predetermined value, and in which the rotor according to claim 3 is embedded.

12. An IPM motor in which a field-weakening control is performed when rotational speed exceeds a predetermined value, and in which the rotor according to claim 4 is embedded.

13. An IPM motor in which a field-weakening control is performed when rotational speed exceeds a predetermined value, and in which the rotor according to claim 5 is embedded.

14. An IPM motor in which a field-weakening control is performed when rotational speed exceeds a predetermined value, and in which the rotor according to claim 7 is embedded.

15. An IPM motor in which a field-weakening control is performed when rotational speed exceeds a predetermined value, and in which the rotor according to claim 8 is embedded.

16. An IPM motor in which a field-weakening control is performed when rotational speed exceeds a predetermined value, and in which the rotor according to claim 9 is embedded.

\* \* \* \* \*